United States Patent
Hwang

(10) Patent No.: US 10,824,656 B2
(45) Date of Patent: Nov. 3, 2020

(54) METHOD AND SYSTEM FOR PROVIDING ADAPTIVE KEYBOARD INTERFACE, AND METHOD FOR INPUTTING REPLY USING ADAPTIVE KEYBOARD BASED ON CONTENT OF CONVERSATION

(71) Applicant: Samsung Electronics Co., Ltd., Suwon-si, Gyeonggi-do (KR)

(72) Inventor: Sung Jae Hwang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 439 days.

(21) Appl. No.: 14/862,595

(22) Filed: Sep. 23, 2015

(65) Prior Publication Data

US 2016/0124970 A1    May 5, 2016

(30) Foreign Application Priority Data

Oct. 30, 2014 (KR) .......... 10-2014-0149137
Dec. 8, 2014 (KR) .......... 10-2014-0174933

(51) Int. Cl.
  *G06F 7/00* (2006.01)
  *G06F 16/332* (2019.01)
  *G06F 1/16* (2006.01)
  *G06F 3/0488* (2013.01)
  *H04L 12/58* (2006.01)
  *G06F 3/0482* (2013.01)
  *G06F 3/023* (2006.01)

(52) U.S. Cl.
  CPC .......... *G06F 16/3322* (2019.01); *G06F 1/163* (2013.01); *G06F 3/023* (2013.01); *G06F 3/0236* (2013.01); *G06F 3/0237* (2013.01); *G06F 3/0482* (2013.01); *G06F 3/04886* (2013.01); *H04L 51/02* (2013.01); *H04L 51/046* (2013.01)

(58) Field of Classification Search
  CPC .................................................. G06F 16/3322
  USPC .......................................................... 707/767
  See application file for complete search history.

(56) References Cited

U.S. PATENT DOCUMENTS 5,243,519 A * 9/1993 Andrews ................. G06F 40/47
                                                       704/8
8,484,573 B1    7/2013 Zhai et al.
(Continued)

FOREIGN PATENT DOCUMENTS

KR    10-2007-0043673 A    4/2007
KR    10-2008-0077797 A    8/2008
(Continued)

OTHER PUBLICATIONS

Korean Office Action dated May 15, 2019, issued in Korean Application No. 10-2014-0168892.

*Primary Examiner* — Eliyah S. Harper
(74) *Attorney, Agent, or Firm* — Jefferson IP Law, LLP

(57) ABSTRACT

A method for providing an adaptive keyboard interface is provided, which includes searching for at least one candidate message that is expected to be prepared by a user with reference to context information about a situation in which the user prepares a message; and if a first text object of text objects that are included in the at least one searched candidate message is selected by the user, providing at least one replacement text object having a degree of association with the first text object, which is equal to or higher than a predetermined level, based on the first text object.

5 Claims, 18 Drawing Sheets

(56) References Cited

U.S. PATENT DOCUMENTS

| | | | |
|---|---|---|---|
| 8,612,213 B1* | 12/2013 | Zhai | G06F 40/232 |
| | | | 704/9 |
| 8,832,064 B2* | 9/2014 | Stenchikova | G06F 16/951 |
| | | | 707/708 |
| 8,838,079 B2 | 9/2014 | Wehrs et al. | |
| 8,843,164 B2 | 9/2014 | Baek | |
| 10,467,342 B2* | 11/2019 | Lu | G06F 40/284 |
| 2002/0120436 A1* | 8/2002 | Mizutani | G10L 15/005 |
| | | | 704/2 |
| 2002/0129015 A1* | 9/2002 | Caudill | G06F 16/353 |
| 2003/0004706 A1* | 1/2003 | Yale | G06F 40/20 |
| | | | 704/9 |
| 2004/0117352 A1* | 6/2004 | Schabes | G06F 16/3344 |
| 2006/0053000 A1* | 3/2006 | Moldovan | G06F 16/243 |
| | | | 704/9 |
| 2006/0204945 A1* | 9/2006 | Masuichi | G09B 7/02 |
| | | | 434/322 |
| 2012/0296635 A1* | 11/2012 | Brockett | G06F 40/247 |
| | | | 704/9 |
| 2015/0081276 A1* | 3/2015 | Gerard | G06F 40/242 |
| | | | 704/9 |

FOREIGN PATENT DOCUMENTS

| | | |
|---|---|---|
| KR | 10-2010-0109034 A | 10/2010 |
| KR | 10-2010-0110628 A | 10/2010 |
| KR | 10-1286293 B1 | 7/2013 |
| KR | 10-2013-0131252 A | 12/2013 |

* cited by examiner

500

"Are you late today?"

Final sentence selected by user : in a moment I will come. Sorry. I started.

"Are you late today?"

I will start right now

Sorry. I forgot.

Since the traffic is heavy

I seem to come fast.

Final sentence selected by user : I will start right now.

METHOD AND SYSTEM FOR PROVIDING ADAPTIVE KEYBOARD INTERFACE, AND METHOD FOR INPUTTING REPLY USING ADAPTIVE KEYBOARD BASED ON CONTENT OF CONVERSATION

CROSS-REFERENCE TO RELATED APPLICATIONS

This application is based on and claims priority from Korean Patent Application No. 10-2014-0149137, filed Oct. 30, 2014 and Korean Patent Application No. 10-2014-0174933, filed Dec. 8, 2014 in the Korean Intellectual Property Office, the disclosure of which is incorporated herein in its entirety by reference.

BACKGROUND

1. Field of the Invention

The present invention relates to a method and a system for providing an adaptive keyboard interface, and a non-transitory computer readable recording medium. Further, the present invention relates to a method for inputting a replay using an adaptive keyboard based on content of conversation.

2. Description of the Prior Art

As a mobile smart device that can be carried in one hand, such as a laptop computer, a smart phone, or a smart pad, is generally used, the usage range of a wearable device that a user can always wear, such as smart glasses, a smart watch, a smart ring, or a smart necklace, has been gradually widened.

Since such a wearable device should be always worn on a body of a user without being awkward, it is physically restricted by shape and size. For example, since the shape or the size of a smart watch that should be worn on a wrist of a user is designed not to greatly secede from that of a traditional wristwatch, it is difficult to mount a display having a large size like a display mounted on a laptop computer or a smart pad on the wearable device. Accordingly, as can be confirmed from FIG. 1A, it becomes difficult for a wearable device that includes a display having a relatively small size to satisfactorily provide a user interface that is required to input various user's operations or messages like a traditional keyboard.

Further, as can be confirmed from FIG. 1B, as the related art to resolve such a problem, a technology has been introduced to provide a user interface through which a message can be input only within a range of pre-stored representative phrases that are commonly used. However, according to the related art, only the phrases that do not totally consider context information about the user's current situation are provided, and thus it becomes difficult to prepare a natural message that coincides with the user's intention.

SUMMARY

Accordingly, the present invention has been made to solve the above-mentioned problems occurring in the prior art, and one subject to be solved by the present invention is to provide a method and an apparatus for providing adaptive keyboard interface, which can provide an adaptive keyboard interface by searching for at least one candidate message that is expected to be prepared by a user with reference to context information about a situation in which the user prepares a message, and if a first text object of text objects that are included in the at least one searched candidate message is selected by the user, providing at least one replacement text object having a degree of association with the first text object, which is equal to or higher than a predetermined level, based on the first text object.

Another subject to be solved by the present invention is to provide a method for inputting a replay using an adaptive keyboard based on the content of conversation, which enables a user to input a text more easily and rapidly on a wearable device.

Additional advantages, subjects, and features of the invention will be set forth in part in the description which follows and in part will become apparent to those having ordinary skill in the art upon examination of the following or may be learned from practice of the invention.

In one aspect of the present invention, there is provided a method for providing an adaptive keyboard interface, which includes searching for at least one candidate message that is expected to be prepared by a user with reference to context information about a situation in which the user prepares a message; and if a first text object of text objects that are included in the at least one searched candidate message is selected by the user, providing at least one replacement text object having a degree of association with the first text object, which is equal to or higher than a predetermined level, based on the first text object.

In another aspect of the present invention, there is provided a method for proving an adaptive keyboard interface, which includes searching for at least one candidate message that is expected to be prepared by a user with reference to context information about a situation in which the user prepares a message; generating at least one candidate text object by separating at least a part of the at least one searched candidate message in a predetermined unit; displaying the at least one generated candidate text object corresponding to at least one virtual key included in a virtual keyboard; and if a first candidate text object of the at least one displayed candidate text object is selected by the user, providing at least one replacement text object having a degree of association with the first text object, which is equal to or higher than a predetermined level, based on the first candidate text object.

In still another aspect of the present invention, there is provided a system for providing an adaptive keyboard interface, which includes a message search unit configured to search for at least one candidate message that is expected to be prepared by a user with reference to context information about a situation in which the user prepares a message; and a message correction unit configured to, if a first text object of text objects that are included in the at least one searched candidate message is selected by the user, provide at least one replacement text object having a degree of association with the first text object, which is equal to or higher than a predetermined level, based on the first text object.

In still another aspect of the present invention, there is provided a system for proving an adaptive keyboard interface, which includes a message search unit configured to search for at least one candidate message that is expected to be prepared by a user with reference to context information about a situation in which the user prepares a message; a text object management unit configured to generate at least one candidate text object by separating at least a part of the at least one searched candidate message in a predetermined unit; a virtual keyboard management unit configured to display the at least one generated candidate text object corresponding to at least one virtual key included in a virtual keyboard; and a message correction unit configured to, if a first candidate text object of the at least one displayed candidate text object is selected by the user, provide at least one replacement text object having a degree of association with the first text object, which is equal to or higher than a predetermined level, based on the first candidate text object.

In still another aspect of the present invention, there is provided a method for inputting a reply using an adaptive keyboard based on content of conversation, which includes receiving a message using a wirelessly communicable wearable device; calling a sentence having similarity and continuity with a received sentence; segmenting the called sentence in the unit of word segments; and arranging an adaptive keyboard in accordance with a usage frequency of the segmented word segments, and selecting the arranged word segments.

In addition, other methods and systems for implementing the present invention, and a non-transitory computer readable recording medium for recording a computer program for executing the method is further provided.

According to the present invention, a user can easily and rapidly input a desired message even using a wearable device and correct the message in a direction desired by the user.

Further, according to the present invention, convenient and accurate message preparation can be supported with reference to personalized message data, such as the past conversation record, or message data that is acquired from a known service, such as a social network service (SNS), even without using a complicated algorithm, such as grammatical analysis or morphological analysis.

Further, according to the present invention, it becomes possible to simply reply to an opposite party's message using a wearable device without the necessity of a complicated algorithm, such as grammatical analysis or morphological analysis.

Further, according to the present invention, it becomes possible to extract a reply that is simple and has high accuracy using an adaptive keyboard based on the past conversation information and SNS data.

The effects of the present invention are not limited to the above-described effects, and further effects that have not been mentioned could be clearly understood by those skilled in the art from the following description.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EMBODIMENTS

Figure 1A:
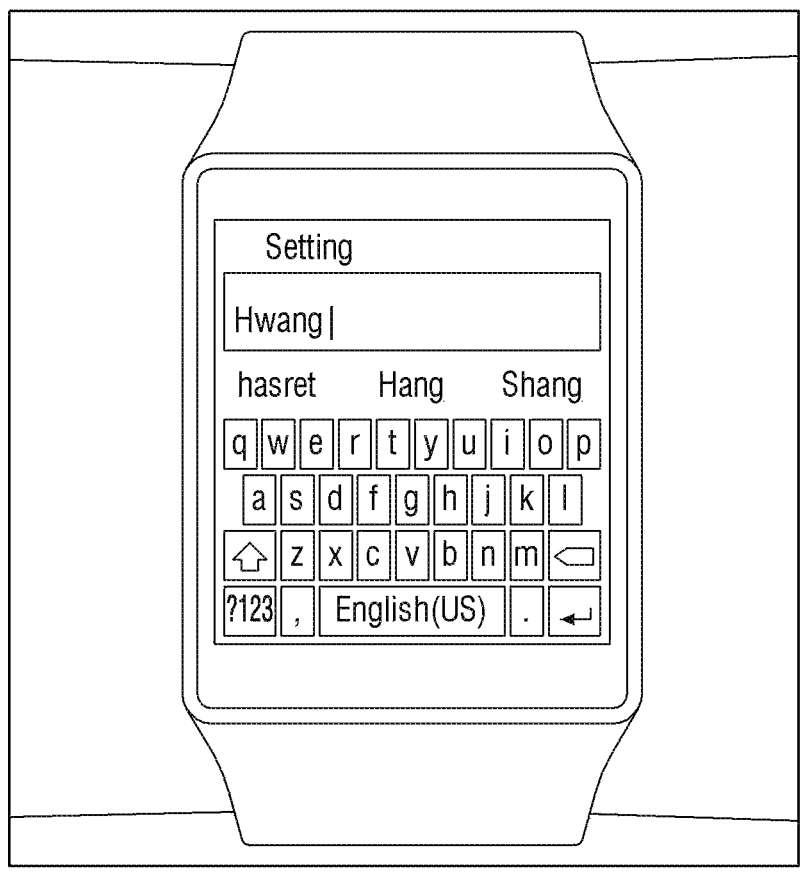
FIGS. 1A and 1B are views exemplarily illustrating the configuration of a wearable device in the related art.
Figure 1B:
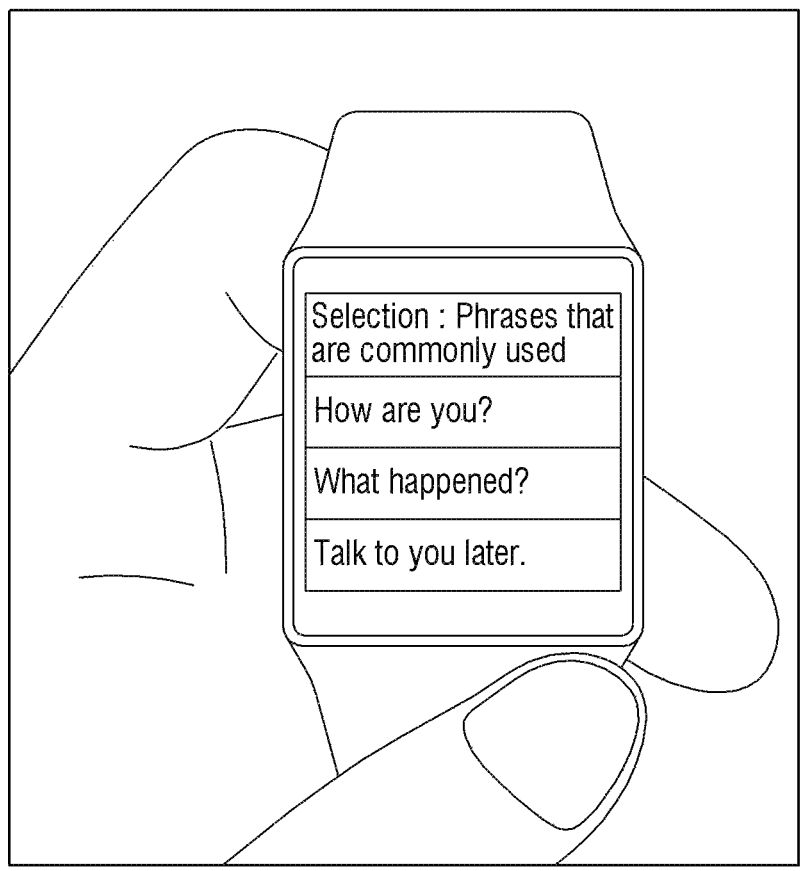

In the following description of the present invention, embodiments of the present invention will be described with reference to plane views and sectional views which are ideal schematic views. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures. Also, the term "and/or" includes the respective described items and combinations thereof.

Hereinafter, preferred embodiments of the present invention will be described in detail with reference to the accompanying drawings so that those of ordinary skill in the art to which the present invention pertains can easily embody the present invention.

Configuration of Whole System

Figure 2:
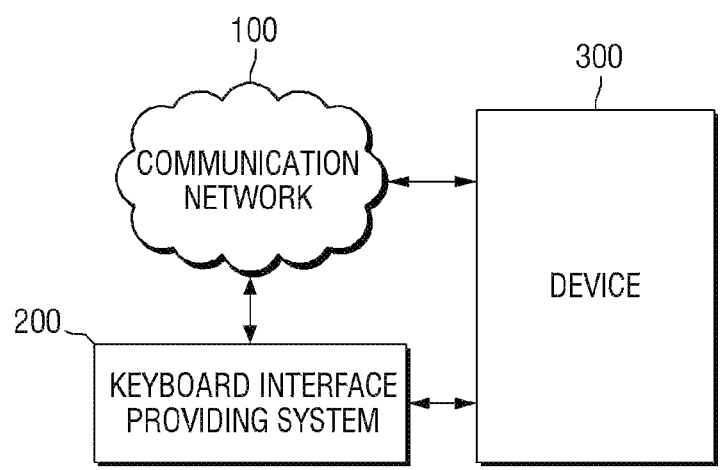
FIG. 2 is a diagram illustrating the schematic configuration of a whole system for providing a keyboard interface according to an embodiment of the present invention.

FIG. 2 is a diagram illustrating the schematic configuration of a whole system for providing a keyboard interface according to an embodiment of the present invention.

As illustrated in FIG. 2, the whole system according to an embodiment of the present invention may include a communication network 100, a keyboard interface providing system 200, and a device 300.

First, the communication network 100 according to an embodiment of the present invention may be configured regardless of the communication type, such as wired communication or wireless communication, and may include various communication networks, such as LAN (Local Area Network), MAN (Metropolitan Area Network), and WAN (Wide Area Network). Preferably, the communication network 100 according to an embodiment of the present invention may be the known Internet or WWW (World Wide Web), but is not limited thereto. The communication network 100 may partially include a known wired/wireless data communication network, a known telephone network, or a known wired/wireless television communication network.

Next, the keyboard interface providing system 200 according to an embodiment of the present invention may be a digital device which is provided with a memory means and a microprocessor mounted therein to perform an arithmetic operation. The keyboard interface providing system 200 may be a server system.

For this, to be described in detail below, the keyboard interface providing system 200 may provide an adaptive keyboard interface by searching for at least one candidate message that is expected to be prepared by a user with reference to context information about a situation in which the user prepares a message, and if a first text object of text objects that are included in the at least one searched candidate message is selected by the user, providing at least one replacement text object having a degree of association with the first text object, which is equal to or higher than a predetermined level, based on the first text object.

Further, to be described in detail below, the keyboard interface system 200 may provide an adaptive keyboard interface by searching for at least one candidate message that is expected to be prepared by a user with reference to context information about a situation in which the user prepares a message, generating at least one candidate text object by separating at least a part of the at least one searched candidate message in a predetermined unit, displaying the at least one generated candidate text object corresponding to at least one virtual key included in a virtual keyboard, and if a first candidate text object of the at least one displayed candidate text object is selected by the user, providing at least one replacement text object having a degree of association with the first text object, which is equal to or higher than a predetermined level, based on the first candidate text object.

Further, the keyboard interface providing system 200 may store information about content of conversation that is provided from the device 300 and further perform a function of making the device 300 use the information again. The storing as described above may be performed by a storage (not illustrated) that is included in the keyboard interface providing system 200. This storage may conceptually include a computer readable recording medium, and may be not only a database in narrow sense but also a database in wide sense that includes a data record based on a file system.

The function of the keyboard interface providing system 200 will be described in more detail below. On the other hand, although the keyboard interface providing system 200 has been described as above, such explanation is exemplary, and it will be apparent to those skilled in the art that at least a part of the function required for the keyboard interface providing system 200 or the constituent elements thereof may be realized in the device in which the keyboard interface is actually implemented (i.e., displayed) or may be included in the device 300.

Last, the device according to an embodiment of the present invention is a digital device that includes a function of performing communication after connecting to the keyboard interface providing system 200 or another device 300, and any digital device which is provided with a memory means and a microprocessor mounted therein to perform an arithmetic operation can be selected as the device 300 according to the present invention. The device 300 may be so called a wearable device, such as smart glasses, a smart watch, a smart band, a smart ring, or a smart necklace, or a somewhat traditional device, such as a smart phone, a smart pad, a desktop computer, a notebook computer, a workstation, a PDA, a web pad, or a mobile phone.

In particular, according to an embodiment of the present invention, the device 300 may include at least one technical means for providing (i.e., displaying) a keyboard interface to a user and receiving an input of an operation from a user. An example of such a technical means may be a touch screen that is a known constituent element.

Further, the device 300 may further include an application program for performing the above-described function. Such an application may exist in the form of a program module in the corresponding device 300. As described above, the character of such a program module may be generally similar to a message search unit 210, a text object management unit 220, a virtual keyboard management unit 230, and a message correction unit 240. Here, at least a part of the application may be replaced by a hardware device or a firmware device that can perform the substantially the same or equivalent function as or to the function of the application.

Configuration of Keyboard Interface Providing System

Hereinafter, function of the internal configuration of a keyboard interface providing system that performs an important function to implement the present invention and respective constituent elements thereof will be described.

Figure 3:
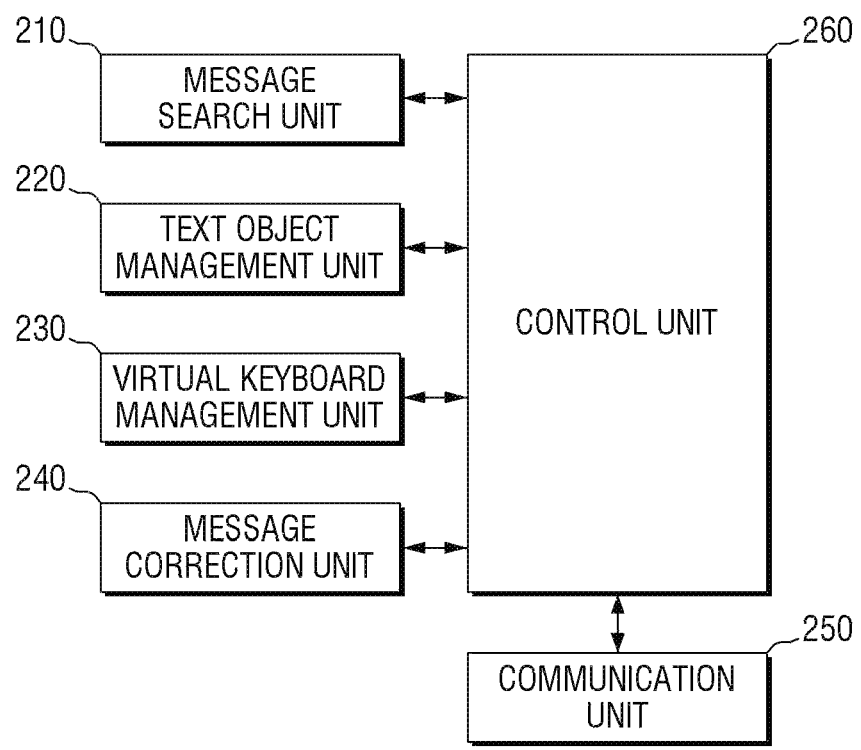
FIG. 3 is a diagram exemplarily illustrating the inner configuration of a system for providing a keyboard interface according to an embodiment of the present invention.

FIG. 3 is a diagram exemplarily illustrating the inner configuration of a system for providing a keyboard interface according to an embodiment of the present invention.

Referring to FIG. 3, a keyboard interface providing system 200 according to an embodiment of the present invention may include a message search unit 210, a text object management unit 220, a virtual keyboard management unit 230, a message correction unit 240, a communication unit 250, and a control unit 260. According to an embodiment of the present invention, at least parts of the message search unit 210, the text object management unit 220, the virtual keyboard management unit 230, the message correction unit 240, the communication unit 250, and the control unit 260 may be program modules that communicate with an external system (not illustrated). Such program modules may be included in the keyboard interface providing system 200 in the form of an operating system, an application program module, and other program modules. Further, such program modules may be stored in a remote storage device that can communicate with the keyboard interface providing system 200. On the other hand, such program modules may include routines for performing a specific task or executing a specific abstract data type to be described later according to the present invention, sub-routines, programs, objects, components, and data structures, but are not limited thereto.

First, according to an embodiment of the present invention, the message search unit 210 may search for at least one candidate message that is expected to be prepared by a user with reference to context information about a situation in which the user prepares a message.

Specifically, according to an embodiment of the present invention, the message search unit 210 may search for at least one candidate message that a first user among a plurality of users is expected to send to a second user with reference to context information about the content of conversation between the plurality of users.

More specifically, the message search unit 210 according to an embodiment of the present invention may search for at least one candidate message that is determined to be appropriate as a reply to the message that the second user has recently sent to the first user with reference to the context information about the content of the conversation between the first user and the second user, and the at least one candidate message that is searched for as described above may have a similarity index or continuity index, which is equal to or higher than a predetermined level, with the message that the second user has recently sent to the first user.

For example, in the case where the second user has sent a message "Are you late today?" to the first user, the message search unit 210 according to an embodiment of the present invention may search for candidate messages, such as "Since the meeting has not yet been finished", "Since the traffic is heavy", "I am coming right now", "I am coming in a moment", "I am starting right now", "Sorry, I forgot", "I started just now", and "I seem to come fast" as reply messages that the first user is expected to send to the second user.

Further, according to an embodiment of the present invention, the message search unit 210 may make a predetermined database a search range in searching for at least one candidate message that the first user is expected to send to the second user.

Specifically, according to an embodiment of the present invention, the message search unit 210 may search for the candidate message from an internal database (not illustrated) for storing past conversation information associated with the first user. For example, the internal database as described above may include a database for storing information about messages that the first user sent to other users in the past and a database for storing information about virtual keys (i.e., text objects) that the first user inputted through a virtual keyboard in the past.

Further, according to an embodiment of the present invention, the message search unit 210 may search for the candidate message from an external database (not illustrated) for storing conversation information (e.g., post writings prepared in a facebook, writings on the edge prepared with respect to the corresponding posting writings, query writings prepared on the Internet café, a reply writing prepared with respect to the query writing) that is acquired from at least one of an SNS (Social Network Service), a web page, an e-mail, a messenger, and an SMS (Short Message Service). More specifically, according to an embodiment of the present invention, the message search unit 210, in searching for candidate messages from the external database, may include not only conversion information associated with the first user but also general conversation information in the search range.

Further, according to an embodiment of the present invention, the message search unit 210 may set a predetermined search condition in searching for at least one candidate message the first user is expected to send to the second user. Specifically, the message search unit 210 may set the search condition based on a time when the second user recently sent a message to the first user, a time when the first user prepares a message that the first user will send to the second user, a current location of the first user or the second user, and demographic information of the first user or the second user. For example, if the first user received a message "What did you have?" from the second user in the evening time zone, a higher weight may be given to a message that was frequently prepared in the evening time zone in searching for the candidate message that the first user is expected to send to the second user. As another example, if the first user is a man in his 30s who resides in Korea, in searching for the candidate message that the first user is expected to send to the second user, a higher weight may be given to a message that was prepared by a man in his 30s who resides in Korea.

Further, according to an embodiment of the present invention, the message search unit 210 may recognize whether the message that the second user recently sent to the first user is in respect language or crude language, and may search for the candidate message that is made in any one of the respect language or crude language in accordance with the result of the recognition.

Further, according to an embodiment of the present invention, the message search unit 210 may perform candidate message search with respect to only conversation information associated with another user having intimacy with the first user that is equal to or higher than a predetermined level. Here, the intimacy between the first user and another user may be determined with reference to information about registration/non-registration of a contact address, phone call frequency, phone call time, zone, a degree of coincidence between contact address information, profile, following time in SNS, frequency or content of conversation in SNS.

On the other hand, in the present invention, context recognition algorithms that may be used to search for at least one candidate message that is determined to be appropriate as a replay to the message that the second user recently sent to the first user with reference to the context information associated with the content of conversation between the first user and the second user are not necessarily limited to those as enumerated above, but other context recognition algorithms may be further used within the range in which the object of the present invention can be achieved.

Next, according to an embodiment of the present invention, the text object management unit 220 may generate at least one candidate text object by separating (i.e., segmenting), in a predetermined unit, at least a part (e.g., candidate message selected by the first user) of the at least one candidate message that is searched for by the message search unit 210.

Specifically, according to an embodiment of the present invention, the text object management unit 220 may separate at least a part of the at least one candidate message that is searched as described above in the unit of a sentence, a word segment, or a morphology, and thus may generate at least one candidate text object in the unit of a sentence, a word segment, or a morphology as the result of the separation.

For example, it may be assumed that a candidate message is separated in the unit of a word segment, and in this case, the candidate messages as searched above, such as "Since the meeting has not yet been finished", "Since the traffic is heavy", "I am coming right now", "I am coming in a moment", "I am starting right now", "Sorry, I forgot", "I started just now", and "I seem to come fast", are separated in the unit of word segments, and thus candidate text objects, such as "right now", "come", "I will", and "I started", may be generated.

Further, according to an embodiment of the present invention, the text object management unit 220 may extract at least one important text object having the degree of importance that is equal to or higher than a predetermined level among the at least one generated candidate text object as generated above. Specifically, according to an embodiment of the present invention, the degree of importance of the candidate text object may be decided on the basis of the usage frequency of the corresponding candidate text object in the past conversation associated with the first user or the usage frequency of the corresponding candidate text object in the conversation that is acquired from at least one of an SNS (Social Network Service), a web page, an e-mail, a messenger, and an SMS (Short Message Service).

Next, according to an embodiment of the present invention, the virtual keyboard management unit 230 may provide an adaptive virtual keyboard to the first user who intends to prepare a message by displaying, on the screen, the at least one generated candidate text object or the at least one extracted important text object corresponding to at least one virtual key included in a virtual keyboard.

Specifically, according to an embodiment of the present invention, the arrangement state of the at least one virtual key that constitutes the virtual keyboard may be decided on the basis of at least one of the number of candidate text objects or important text objects corresponding to the at least one virtual key, the length thereof, and the degree of importance thereof. For example, if there are a large number of candidate text objects or important text objects to be displayed, a large number of virtual keys may be entirely displayed with a small size, and if the length of the candidate text object or the important text object to be displayed is long, the virtual key corresponding to this may be displayed with a large size. Further, as the degree of importance of the candidate text object or the important text object to be displayed becomes higher, the corresponding virtual key can be displayed on a region having a higher degree of attention.

Further, according to an embodiment of the present invention, the virtual keyboard management unit 230 may display, on a screen, a text object (e.g., a period or a comma), that is commonly input, corresponding to the virtual key regardless of the generated candidate text object or the extracted important text object as described above. For example, if the second user sends a message corresponding to a question to the first user, the virtual keyboard management unit 230 may display, on the screen, a text object "Yes" or "No" that is a short answer corresponding to the virtual key.

Further, according to an embodiment of the present invention, the virtual keyboard management unit 230 may construct at least one of a plurality of virtual keys that constitute the virtual keyboard as a traditional keyboard (e.g., qwerty keyboard or ahnmatae Hangul keyboard).

Next, according to an embodiment of the present invention, if the first text object among text objects included in at least one candidate message that is searched for by the message search unit 210 is selected by a user, the message correction unit 240 provides at least one replacement text object having the degree of association with the first text object, which is equal to or higher than a predetermined level, based on the first text object.

Further, according to an embodiment of the present invention, if the first candidate text object of the at least one displayed candidate text object is selected by a user through the virtual keyboard management unit 230, the message correction unit 240 provides at least one replacement text object having the degree of association with the first candidate text object, which is equal to or higher than a predetermined level, based on the first candidate text object.

That is, if a user selects a text object of which the correction is determined to be necessary among text objects included in a recommended candidate message with reference to the context information, the message correction unit 240 according to an embodiment of the present invention provides the replacement text object having high degree of association with the selected text object to the user, so that the user can replace the correction-required text object by another text object. Accordingly, the user can accurately prepare a message that is desired by the user through performing of minimum operations only.

Specifically, according to an embodiment of the present invention, the degree of association between the text object selected by the user and the replacement text object may be decided on the basis of a word graph that includes the text object selected by the user. Further, according to an embodiment of the present invention, the degree of correlation between the text objects may be calculated on the basis of cosine similarity.

Here, the word graph corresponds to stored data in which the meaningful association between words (i.e., text object) is recorded in the form of a network. A word having a relatively similar meaning is recorded in a short distance, and a word having a non-similar meaning is recorded in a long distance. This may be also called a word map. As a representatively known word graph, there is OpenCyc by a Wordnet and artificial intellectual project Cyc made by Institute for Cognitive Science of Princeton University. Thesaurus that is a thesaurus dictionary may be a kind of word graph. As described above, the word graph stores the meaningful association and the distance between words in the form that can be processed by a computer, and thus it serves as a useful knowledge base when the computer processes the artificial intellectual association algorithm.

FIGS. 10 to 14 are diagrams exemplarily illustrating the configuration of a word graph according to an embodiment of the present invention.

More detailed content of the word graph is disclosed in Korean Registered Patent Publication No. 1286293 (it may be considered that this publication is combined with the description as a whole).

Further, according to an embodiment of the present invention, the message correction unit 240 may replace the text object (or candidate text object to be corrected) by a specific replacement text object selected by the user among the at least one replacement text object provided as above.

Next, according to an embodiment of the present invention, the communication unit 250 functions to make the keyboard interface providing system communicate with an external device.

Last, according to an embodiment of the present invention, the control unit 260 controls data flow among the message search unit 210, the text object management unit 220, the virtual keyboard management unit 230, the message correction unit 240, and the communication unit 250. That is, the control unit 260 controls the data follow from an outside or among the constituent elements of the keyboard interface providing system 200, so that the message search unit 210, the text object management unit 220, the virtual keyboard management unit 230, the message correction unit 240, and the communication unit 250 perform their own functions.

Embodiments

FIGS. 4 to 9 are diagrams exemplarily illustrating the configuration that provides a keyboard interface according to an embodiment of the present invention. In an embodiment of FIGS. 4 to 9, it may be assumed that an adaptive keyboard interface according to the present invention is provided in a state where the first user and the second user have a conversation with each other through sending and receiving of messages with each other.

Figure 4:
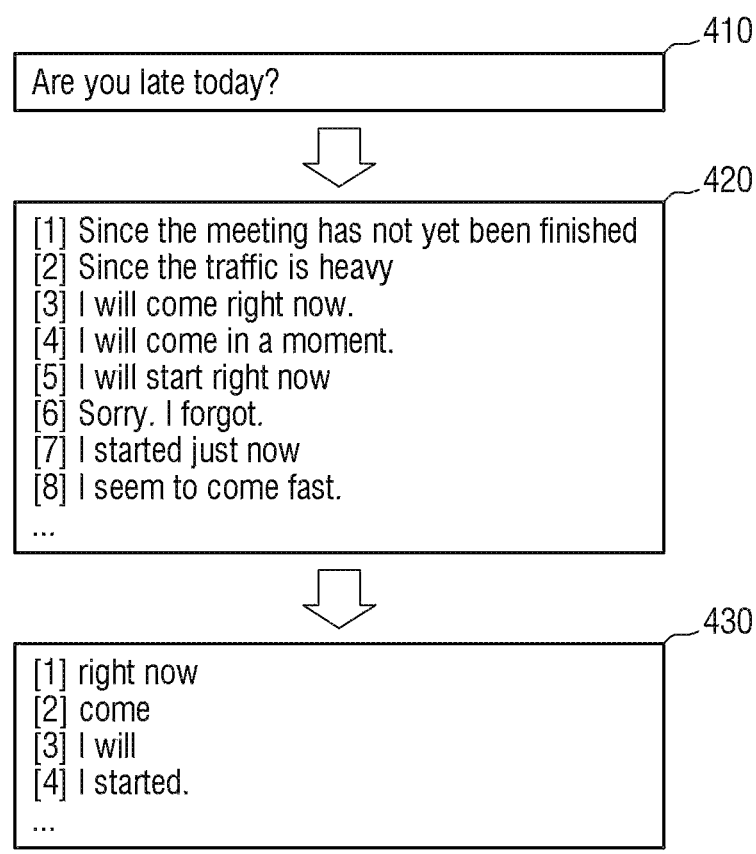
FIGS. 4 to 9 are diagrams exemplarily illustrating the configuration that provides a keyboard interface according to an embodiment of the present invention.

First, referring to FIG. 4, the second user may send a message 410 "Are you late today?" to the first user, and in this case, the keyboard interface providing system 200, as a reply message that the first user is expected to send to the second user, may search for candidate messages 420, such as "Since the meeting has not yet been finished", "Since the traffic is heavy", "I am coming right now", "I am coming in a moment", "I am starting right now", "Sorry, I forgot", "I started just now", and "I seem to come fast", and may generate "right now", "come", "I will", and "I started" by separating the searched candidate message 420 in the unit of word segments.

Figure 5:
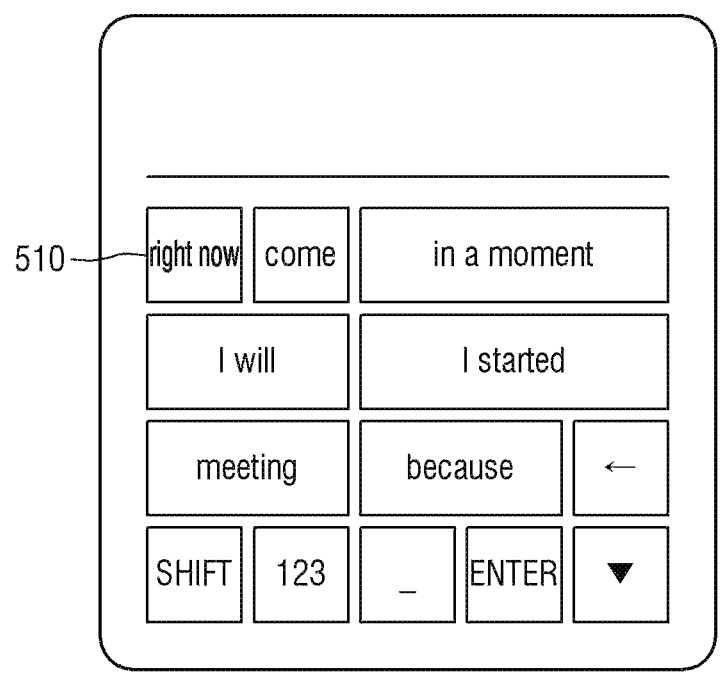

Next, referring to FIG. 5, the keyboard interface providing system 200 according to the present invention may display a plurality of candidate text objects (or important text objects) 430, such as "right now", "come", "I will", "meeting", "in a moment", "I started", and "since", corresponding to a plurality of virtual keys 510 of a virtual keyboard 500. As illustrated in FIG. 5, in comparison to a traditional keyboard, since the virtual keyboard 500 according to the present invention is composed of a small number of virtual keys 510 that correspond to the candidate text objects (or important text objects) that are expected to be selected by the first user, the respective virtual keys 510 that constitute the virtual keyboard 500 can be displayed even on s small display screen of the wearable device with a sufficiently large size, and thus the first user can easily and accurately select the virtual key corresponding to the text object that the first user intends to input through the small display screen of the wearable device.

Figure 6A:
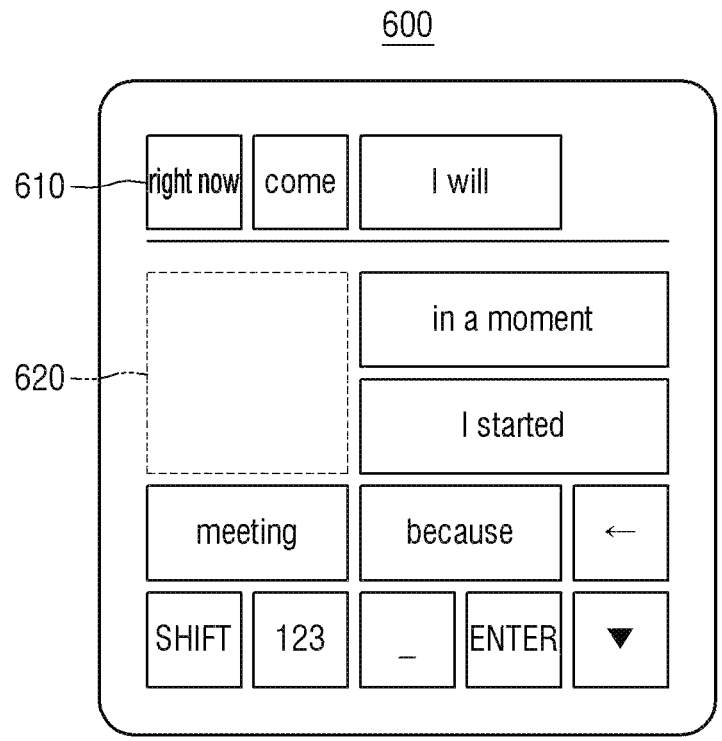
Figure 6B:
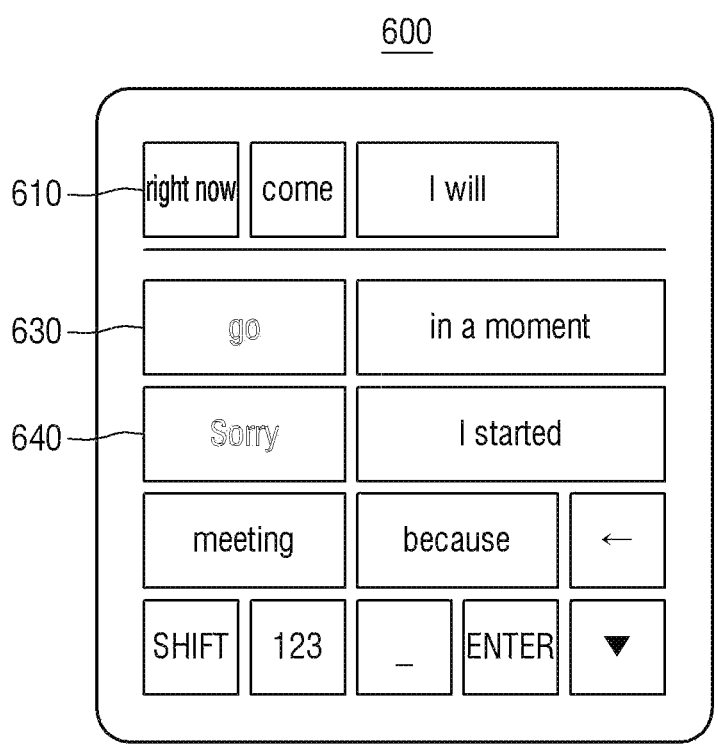

Next, referring to FIG. 6, if a specific virtual key 610 among virtual keys that constitute a virtual keyboard 600 is selected by the first user, the keyboard interface providing system 300 may empty a region 620 on which the corresponding virtual key 610 is displayed (refer to FIG. 6A), or replace the corresponding virtual key 610 by virtual keys 630 and 640 that correspond to other candidate text objects (refer to FIG. 6B). In this case, the other candidate text objects may be candidate text objects having the degree of importance that is lower than the degree of importance of the candidate text object that has been displayed through the virtual keyboard 600

Figure 7:
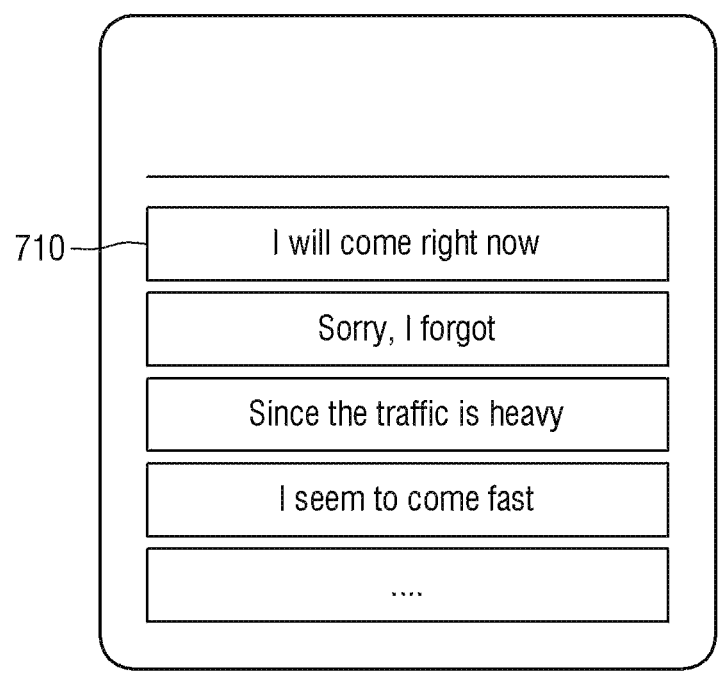

Next, referring to FIG. 7, the keyboard interface providing system 200 may display the candidate text objects in the unit of a sentence corresponding to a plurality of virtual keys 710 of a virtual key 700.

Figure 8:
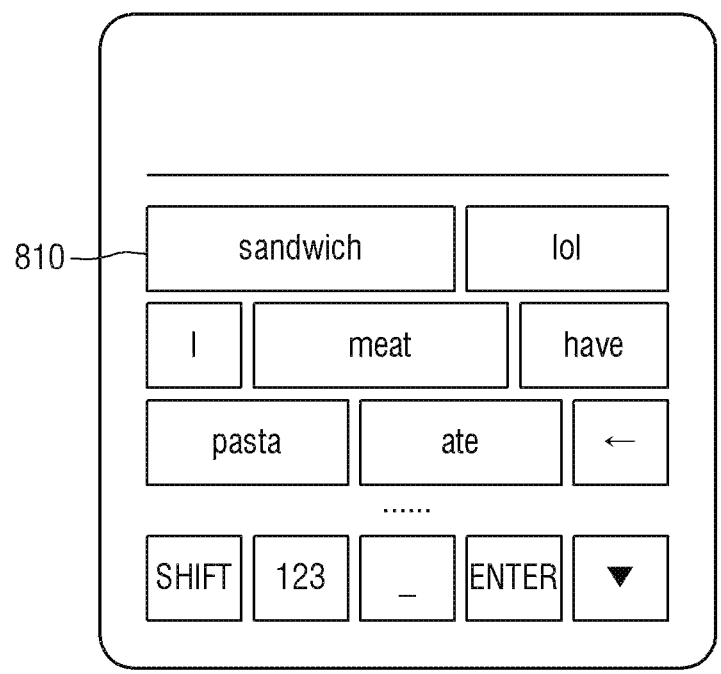

Next, referring to FIG. 8, the keyboard interface providing system 200 may display English candidate text objects corresponding to a plurality of virtual key 810 of a virtual keyboard 800.

Figure 9:
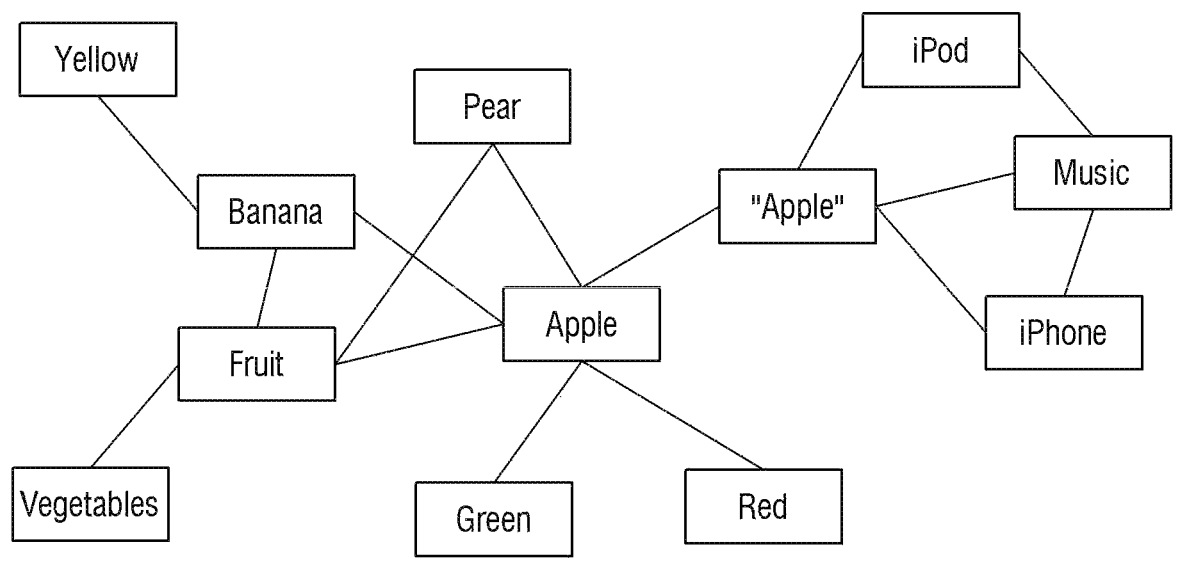
Figure 10:
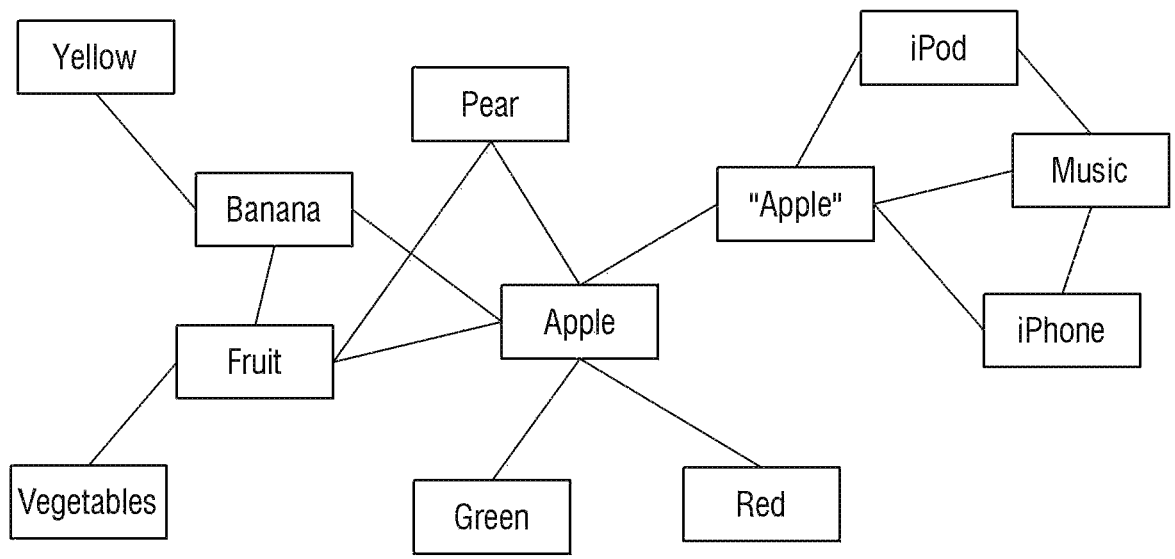
FIGS. 10 to 14 are diagrams exemplarily illustrating the configuration of a word graph according to an embodiment of the present invention.
Figure 11:
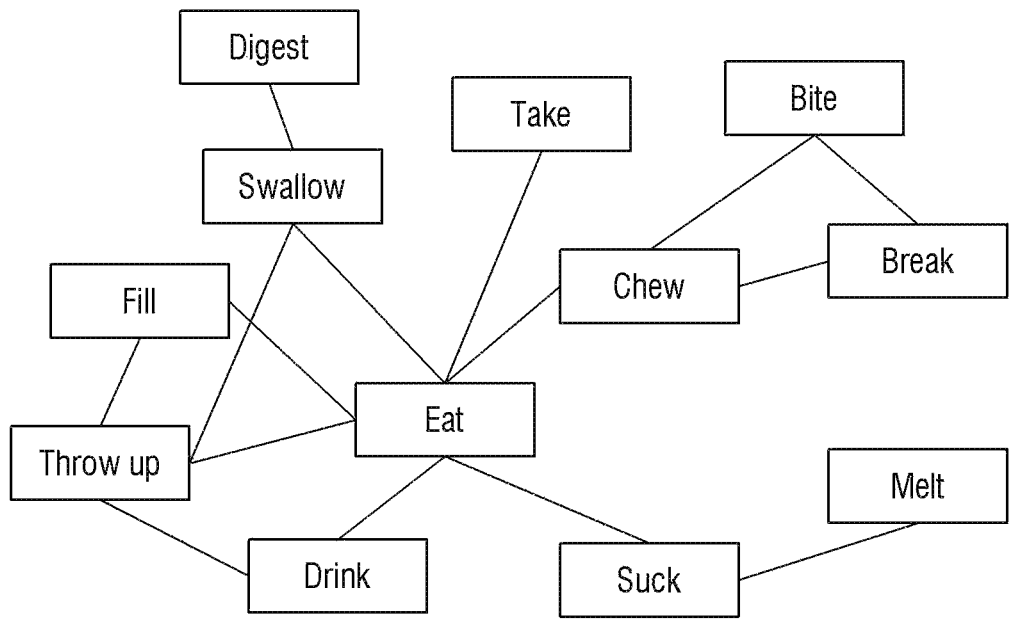
Figure 12:
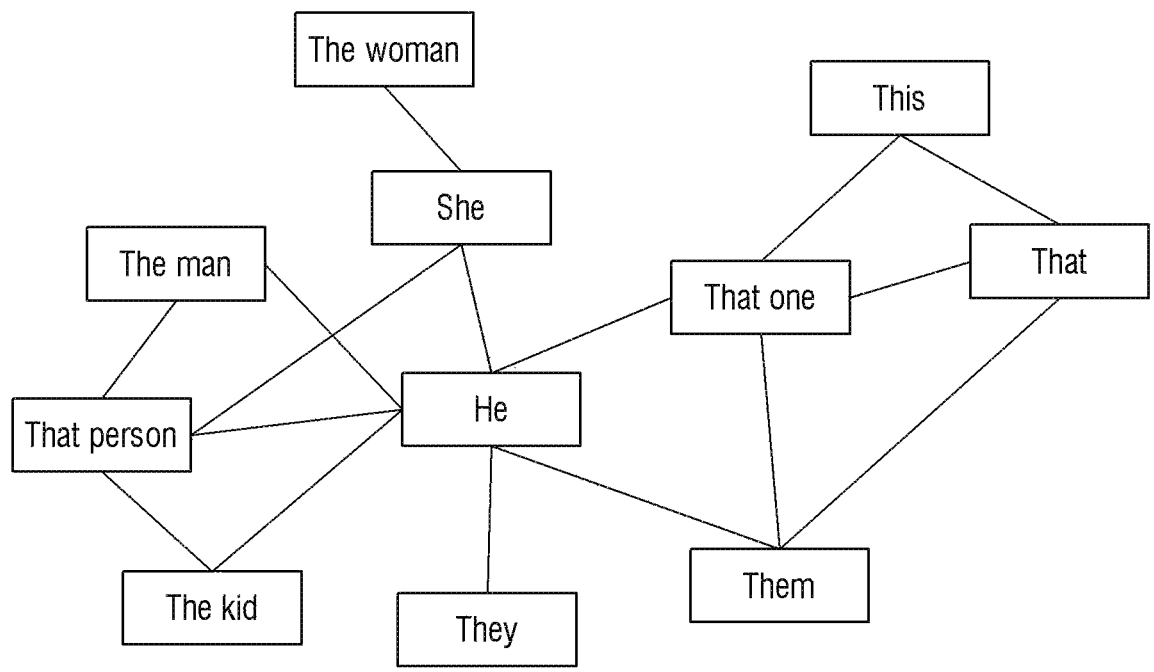
Figure 13:
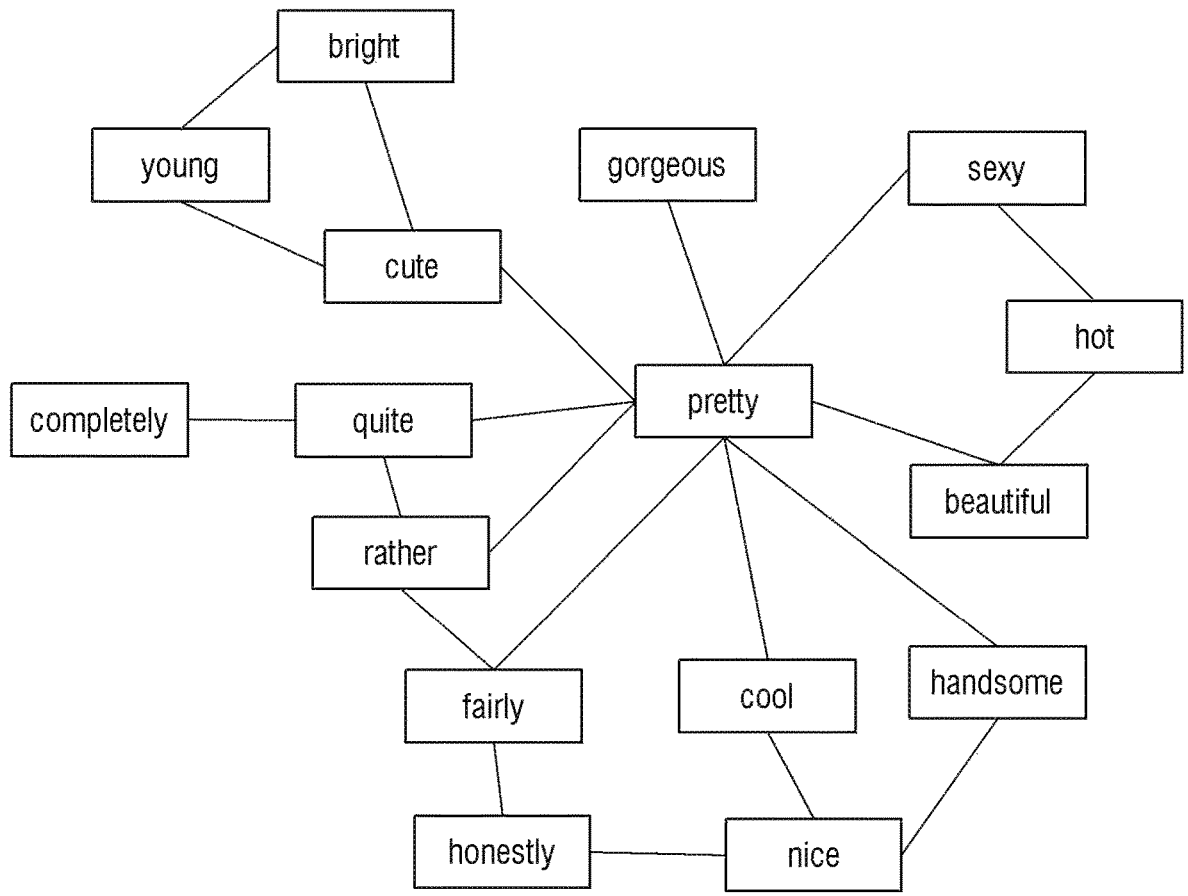
Figure 14:
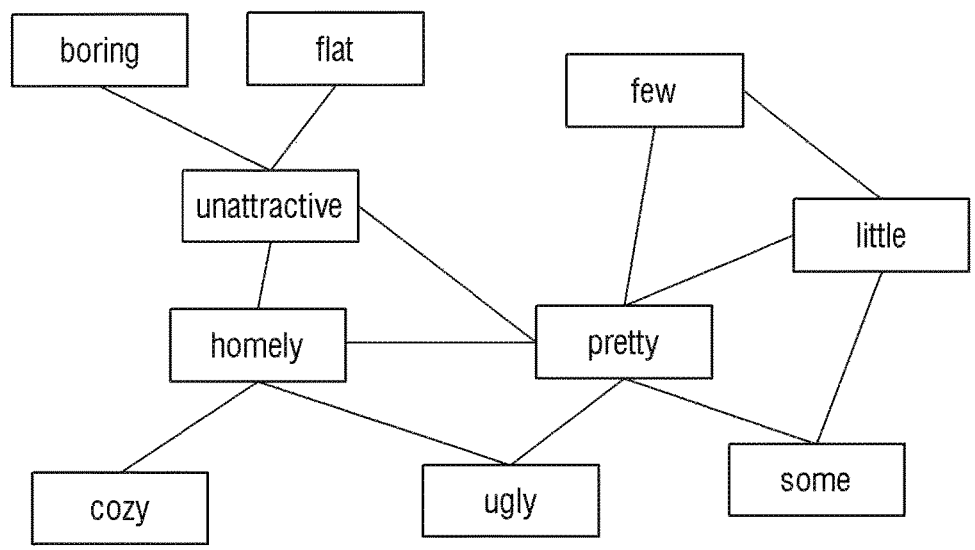

Next, referring to FIG. 9, the keyboard interface providing system 200 may display not only a virtual key 910 corresponding to a candidate text object composed of text but also a candidate object 920 that is composed of various types of content, such as an image (e.g., emoticon, picture, or photo), moving image, and audio, corresponding to the virtual key 910 constituting the virtual keyboard. For this, the keyboard interface providing system 200 according to an embodiment of the present invention may search for the candidate object that is composed of content that the first user among a plurality of users is expected to send to the second user with reference to context information about the content of conversation between the plurality of users.

As described above, an embodiment has mainly been described, in which the adoptive keyboard interface is provided with reference to the context information in a state where a plurality of users have a conversation through messages. However the present invention is not limited to the above-described embodiments, but may be applied to a case where the key board interface for inputting the text information is necessary. For example, the keyboard interface providing system 200 according to another embodiment of present invention my provide an adaptive keyboard interface according to the present invention with reference to the context information that can be grasped from the corresponding electronic document in the case where the user prepares a typical electronic document. As another example, in the case where a user prepares Internet post writings or writings on the edge, the keyboard interface providing system 200 may provide an adaptive keyboard interface according to the present invention with reference to context information that can be grasped from the corresponding post writings or other post writings of a posting board to which the corresponding post writings belong.

On the other hand, a user may directly input his/her own speech to prepare a message or a specific command, and in this case, speech recognition may not be accurately performed due to surrounding noises. According to another embodiment of the present invention, a keyboard interface providing system 200 that can supplement the problem is provided.

Specifically, according to another embodiment of the present invention, in the case where the speech that is input from the user is vague and thus is difficult to be accurately recognized, the keyboard interface providing system 200 performs a function to easily and accurately prepare a message that the user intends with his/her speech by searching for at least one candidate message corresponding to the result of the speech recognition, generating at least one candidate text object through separation of at least a part of the at least one candidate message in a predetermined unit, and displaying the at least one generated candidate text object corresponding to at least one virtual key included in a virtual keyboard. That is, according to another embodiment, the keyboard interface providing system 200 may provide an adaptive keyboard interface with reference to information about the result of the speech recognition for the speech input from the user as context information about the situation in which the user prepares a message.

For example, it may be assumed that the second user sends a message "What time is it now?" to the first user, and the first user inputs a speech "eleven o'clock" to prepare the corresponding message. In this case, the keyboard interface providing system 200 according to another embodiment may recognize the speech "eleven o'clock" that is input from the first user, and search for candidate messages, such as "eleven o'clock", "ten o'clock, and "one o'clock, having the degree of similarity in pronunciation that is equal to or higher than a predetermined level. Further, the keyboard interface providing system 200 may generate candidate text objects, such as "eleven o'clock", "ten o'clock, and "one o'clock" through separation of the searched candidate message in the unit of word segments, and display the generated candidate text objects corresponding to the virtual keys of the virtual keyboard. Accordingly, the first user can easily and accurately select the candidate text object that is really intended by the user among the displayed candidate text objects which the first user determines that the pronunciation is similar to that of the speech input by the user and is displayed corresponding to the virtual keys of the virtual keyboard.

FIGS. 15 to 17C are diagrams exemplarily illustrating the configuration that provides a keyboard interface according to an embodiment of the present invention. In an embodiment of FIGS. 15 to 17C, it may be assumed that an adaptive keyboard interface according to the present invention is provided in a state where the first user and the second user have a conversation with each other through sending and receiving of messages with each other.

Figure 15:
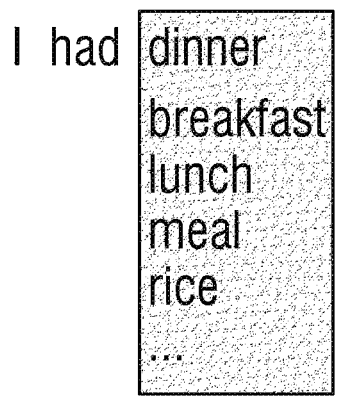
FIGS. 15 to 17C are diagrams exemplarily illustrating the configuration that provides a keyboard interface according to an embodiment of the present invention.

First, referring to FIG. 15, a user who receives a candidate message "I had dinner" through a display screen of a wearable device 300 may select (e.g., touch) a text object "dinner" of the message as a correction target, and accordingly, replacement text objects "breakfast", "lunch", "meal", and "rice" having the degree of association with the text object "dinner" which is equal to or higher than a predetermined level may be provided to the user. Here, the order (i.e., alignment order) in which the replacement text objects "breakfast", "lunch", "meal", and "rice" are displayed may be decided depending on whether the degree of association with the text object "dinner" is high or low. In continuation, the user may select the replacement text object "breakfast" among the plurality of replacement text objects, and accordingly, the candidate message "I had dinner" may be corrected to a message "I had breakfast".

Figure 16:
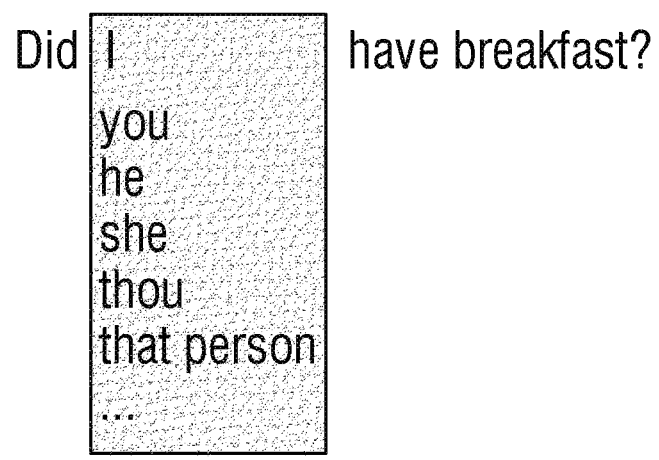

Next, referring to FIG. 16, a user who receives a candidate message "Did I have dinner?" through a display screen of a wearable device 300 may select (e.g., touch) a text object "I" of the message as a correction target, and accordingly, replacement text objects "you", "he", "meal", "she", "thou", and "that person" having the degree of association with the text object "I" which is equal to or higher than a predetermined level may be provided to the user. Here, the order (i.e., alignment order) in which the replacement text objects "you", "he", "meal", "she", "thou", and "that person" are displayed may be decided depending on whether the degree of association with the text object "I" is high or low. In continuation, the user may select the replacement text object "you" among the plurality of replacement text objects, and accordingly, the candidate message "Did I have dinner?" may be corrected to a message "Did you have dinner?".

Figure 17A:
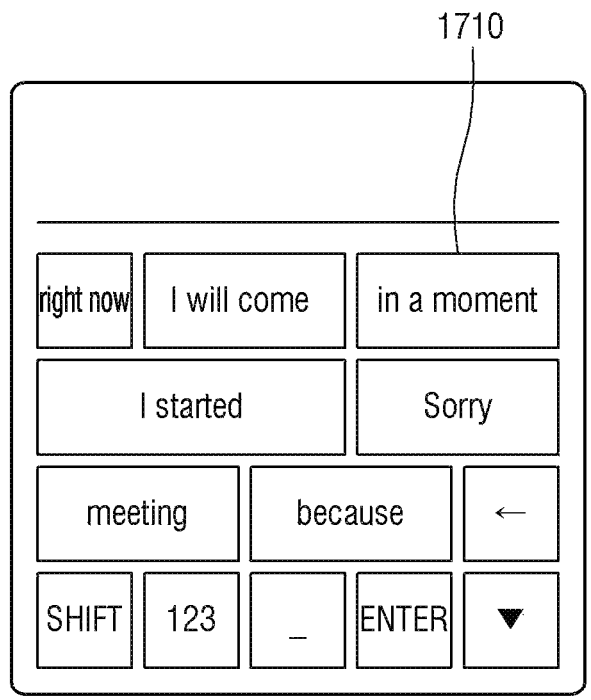
Figure 17B:
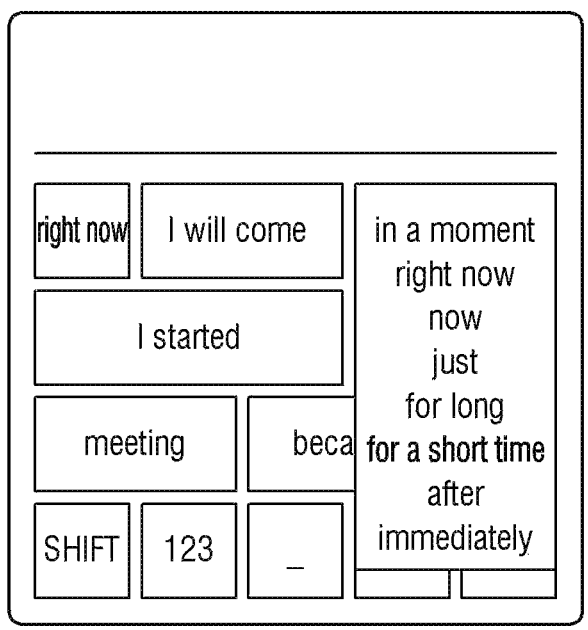
Figure 17C:
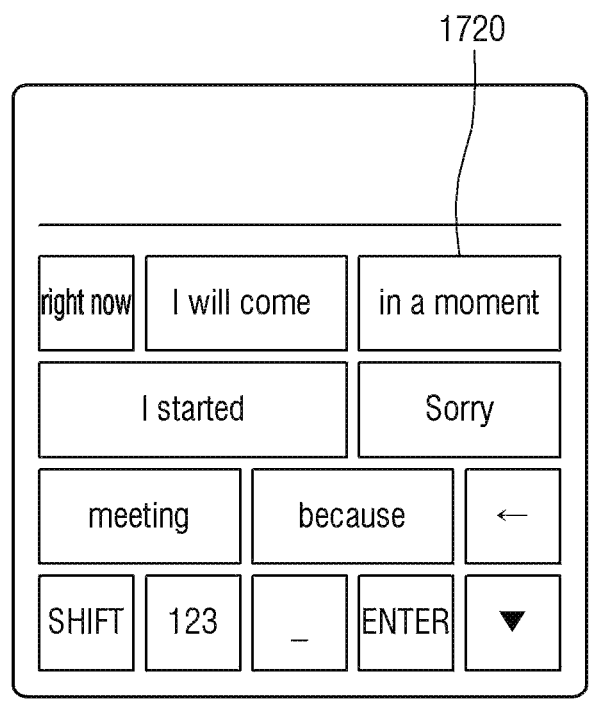

Next, referring to FIGS. 17A to 17C, the keyboard interface providing system 200 according to the present invention may display a plurality of candidate text objects "right now", "I will come", "in a moment", "I started", "Sorry", "meeting", and "since" corresponding to a plurality of virtual keys of a virtual keyboard. Here, a user may select (e.g., touch) a text object 1710 "in a moment" as a correction target, and accordingly, replacement text objects "right now", "now", "just", "for long", "for a while", "after", and "immediately" having the degree of association with the text object 1710 "in a moment" which is equal to or higher than a predetermined level may be displayed on the virtual keyboard in the form of drop down menu. Here, the order (i.e., alignment order) in which the replacement text objects "right now", "now", "just", "for long", "for a while", "after", and "immediately" are displayed may be decided depending on whether the degree of association with the text object 1710 "in a moment" is high or low. In continuation, the user may select the replacement text object "just" among the plurality of replacement text objects that are displayed on the virtual keyboard, and accordingly, the replacement text object 1720 "just" may be displayed on the virtual key on which the text object 1710 "in a moment" was displayed. As described above, according to the present invention, the user can easily correct the text object that is intended to be corrected among the text objects displayed on the virtual keyboard provided to the user to another text object.

In the same manner as the method and the system for providing an adaptive keyboard interface according to embodiments of the present invention with reference to FIS. 2 to 17C, a method for inputting a text more easily and rapidly in a wearable device through reflection of context of conversation according to another embodiment of the present invention will be described with reference to FIGS. 18 to 20.

A method for inputting a replay using an adaptive keyboard based on content of conversation according to another embodiment of the present invention may be performed by a computing device. The computing device may be the system for providing an adaptive keyboard interface as described above with reference to FIGS. 2 to 17C.

The method for inputting a reply using an adaptive keyboard based on content of conversation includes receiving a message using a wirelessly communicable wearable device; calling a sentence having similarity and continuity with a received sentence; segmenting the called sentence in the unit of word segments; and arranging an adaptive keyboard in accordance with a usage frequency of the segmented word segments, and selecting the arranged word segments.

In addition, the method for inputting a reply using an adaptive keyboard based on content of conversation according to another embodiment of the present invention may be further provided with other configurations according to the technical idea.

According to the method for inputting a reply using an adaptive keyboard based on content of conversation according to another embodiment of the present invention, it becomes possible to simply reply to an opposite party's message using a wearable device without using a complicated algorithm, such as grammatical analysis or morphological analysis.

According to the method for inputting a reply using an adaptive keyboard based on content of conversation according to another embodiment of the present invention, it is possible to extract a reply which is simple and has high accuracy using an adaptive keyboard based on the past conversation information and SNS data.

Figure 18:
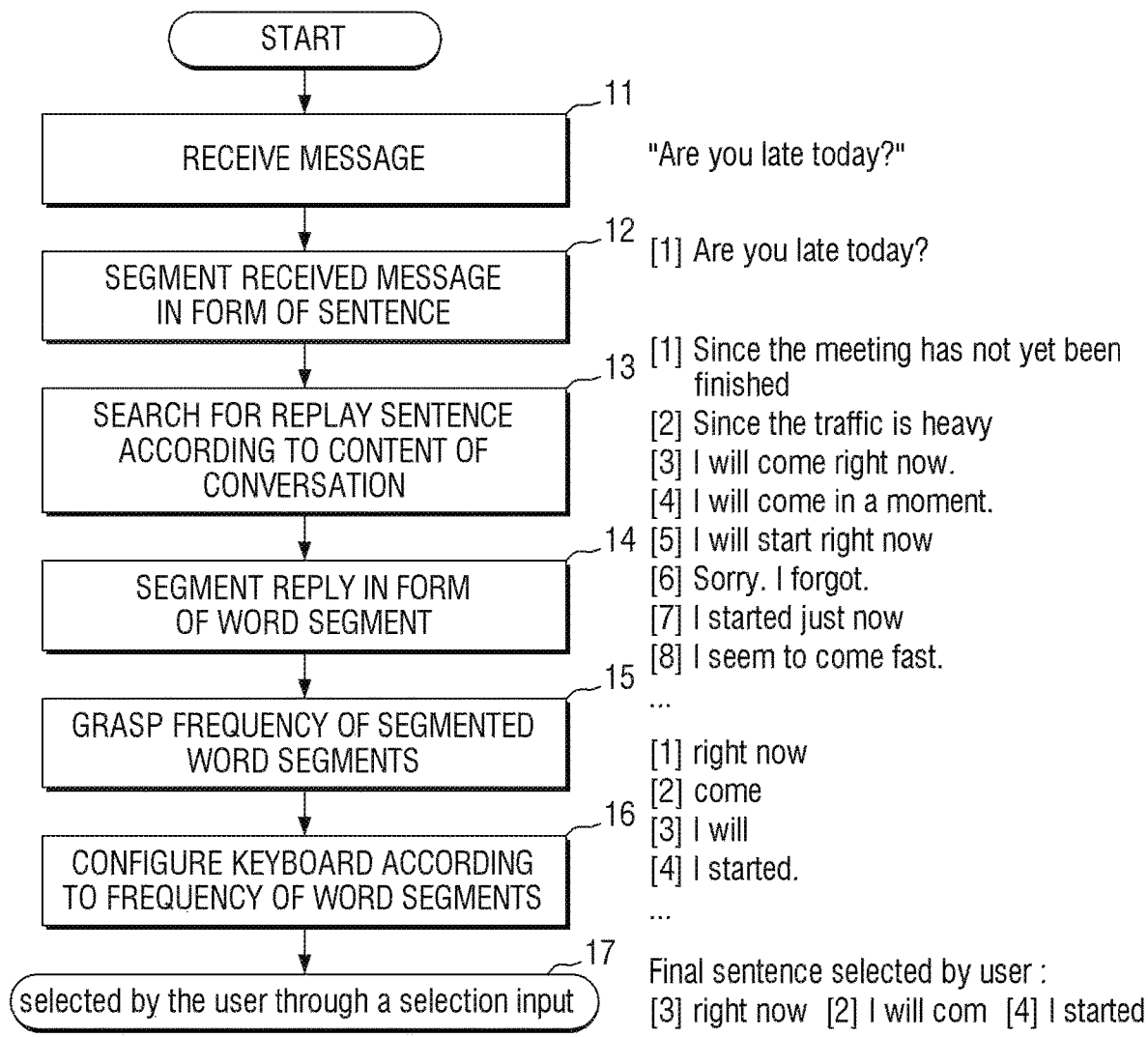
FIG. 18 is a flowchart illustrating that a user selects a final sentence on a wearable device using an adaptive keyboard based on content of conversation according to another embodiment of the present invention.

FIG. 18 is a flowchart illustrating that a user selects a final sentence on a wearable device using an adaptive keyboard based on content of conversation according to another embodiment of the present invention.

In order to help understanding of a method for inputting a replay using an adaptive keyboard based on content of conversation according to another embodiment of the present invention, explanation will be made around a smart watch that is one of wearable devices to which an adaptive keyboard based on the content of conversation can be applied.

It is assumed that at least two users of an interactive messenger, an SMS (Short Message Service), or an MMS (Multimedia Message Service), which are built in the smart watch, communicate with each other using an application or a platform that can perform message transmission and reception.

Referring to FIG. 18, the content of conversation is inputted using the wearable device as an adaptive keyboard based on the content of the conversation in a state where the number of hits for inputting the content of the conversation and the number of keyboards shown on the screen are minimized while the conversation continues naturally.

First, a user receives a message "Are you late today?" (11). Thereafter, the message is segmented in the form of sentences (12), and the next step proceeds with one resultant value that is caused by one sentence "Are you later today?". The reply sentence search (13) according to the content of the sentence, such as the SNS (Social Network Service) or web page search, may be performed using an external database, and the user can use an e-mail based on the user's account, an SNS (Social Network Service), a messenger, an SMS (Short Message Service), and personalized data, such as history information of the adaptive keyboard based on the content of the conversation.

In an embodiment with reference to FIG. 18, total eight sentences of "Since the meeting has not yet been finished", "Since the traffic is heavy", "I am coming right now", "I am coming in a moment", "I am starting right now", "Sorry, I forgot", "I started just now", and "I seem to come fast" have been searched for. One of the eight sentences may be selected by the user through a selection input step (17). Further, the number search results may be changed according to setting of the adaptive keyboard based on the content of the conversation.

The eight sentences are segmented in the form of word segments (14). In the frequency grasping step (15), the usage frequency of the segmented word segments is enquired. In this case, mother data for enquiring the usage frequency may be provided using an external database, such as SNS (Social Network Service) or web page search, and personalized data of the e-mail, the SNS, the messenger, and the SMS based on the user's account may be used In the case of searching for the usage frequency of the respective word segments using the personalized data, different usage frequencies may be enquired for the respective users.

In an embodiment with reference to FIG. 18, the usage frequency has been enquired in the order of "right now", "I will come", "in a moment", and "I started". Thereafter, a keyboard configuration step (16) is performed according to the frequencies of the word segments, and FIGS. 19 and 20 may be referred to with respect to the detailed configuration method. After the keyboard configuration step (16) according to the frequencies of the word segments, the user selects the word segments displayed on the screen of the wearable device due to an upper usage frequency.

In an embodiment with reference to FIG. 18, a sentence "I am coming in a moment. I started" is completed. In this case, the keyboard may be provided in an add-on type in the existing keyboard application, or may be separately used. Further, in this embodiment, a reply is segmented in the form of word segments (14), the frequency of the segmented word segments is grasped (15), and the segmentation or grasping of the frequency is performed according to the frequencies of the word segments in the keyboard configuration step (16). The unit for segmentation or grasping of the frequency in the above-described three steps may be morphology.

Figure 19:
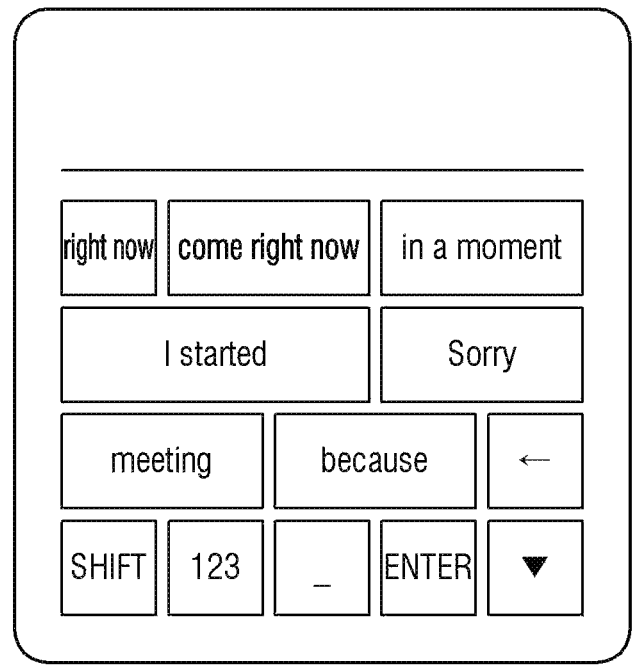
FIG. 19 is a diagram illustrating that an adaptive keyboard based on content of conversation is shown on a wearable device in the form of segmented word segments.

FIG. 19 is a diagram illustrating that an adaptive keyboard based on content of conversation is shown on a wearable device in the form of segmented word segments.

In the wearable device having a relatively small size, word segments may be aligned in the form of a block from the left upper side. With respect to the content of the sentence "Are you later today?", a replay sentence is searched for (13), the reply is segmented in the form of word segments (14), the frequency of the segmented word segments is grasped (15), and total seven word segments of "right now", "I will go", "in a moment", "I started", "Sorry", "meeting", and "since" are displayed on the screen through the keyboard configuration step (16) according to the frequency of the word segments. The number of word segments shown on the screen may differ depending on the length of the searched word segment or the size of font.

Thereafter, a sentence "I am coming in a moment. Sorry I started" may be completed by user's selection of word segments (17).

Figure 20:
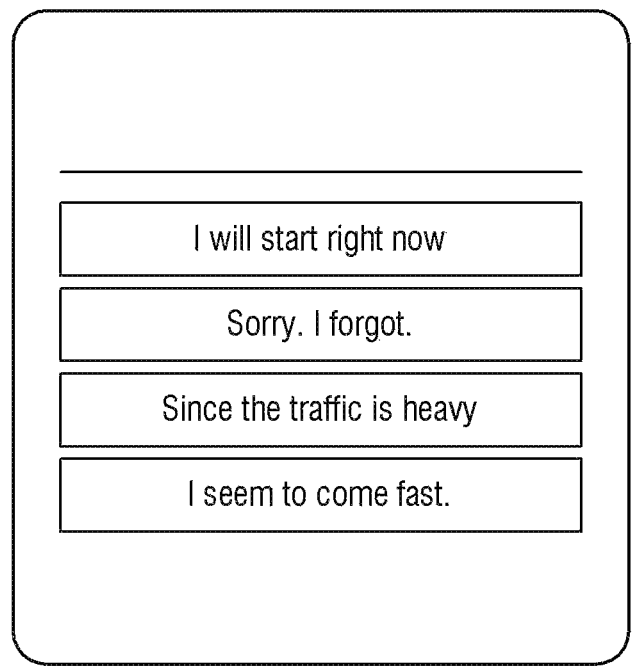
FIG. 20 is a diagram illustrating that an adaptive keyboard based on content of conversation is shown on a wearable device in the form of segmented sentences.

FIG. 20 is a diagram illustrating that an adaptive keyboard based on content of conversation is shown on a wearable device in the form of segmented sentences.

In the wearable device having a relatively small size, word segments may be aligned in the form of a block from the left upper side. With respect to the content of the sentence "Are you later today?", a replay sentence is searched for (13), and total four sentences of "I am starting right now", "Sorry, I forgot", "Since the traffic is heavy", and "I seem to come fast" are displayed on the screen according to the frequency of the sentences. The number of sentences shown on the screen may differ depending on the length of the searched sentence or the size of the font.

Thereafter, through the selection input step (17) a sentence "I am starting right now" can be completed by the user's selection of the sentence.

Various embodiments of the present invention as described above may be implemented in the form of a program command that can be performed through various computer constituent elements, and may be recorded in a non-transitory computer readable recording medium. Although all the constituent elements can be implemented by independent hardware, a part or the whole of the constituent elements may be selectively combined, and may be implemented as a computer program having program modules that perform a part or the whole of the functions that are combined in one or plural hardware configurations. Here, the non-transitory computer readable medium is not a medium that stores data for a short period, such as a register, a cache, or a memory, but means a medium which semi-permanently stores data and is readable by a device. Specifically, various applications and programs as described above may be stored and provided in the non-transitory computer readable medium, such as, a CD, a DVD, a magneto-optical media, such as floptical disk, a ROM, a RAM, and a flash memory. Codes and code segments that constitute the computer program may be easily induced by skilled in the art the present disclosure pertains. Such a computer program may be stored in the non-transitory computer readable recording medium in the form of a program.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for operating an electronic device, the method comprising:
  receiving, by the electronic device, a first message including a first sentence from an external device, through a communication established between the electronic device and the external device;
  identifying, by the electronic device, a plurality of candidate sentences as a response to the first sentence based at least partially on context information which is identified based on at least one message which is received by the electronic device or is transmitted from the electronic device;
  in response to separating the plurality of candidate sentences as a predetermined unit, identifying a plurality of words included in the plurality of candidate sentences;
  displaying, by the electronic device, a user interface including a plurality of keys corresponding to the plurality of words;
  in response to a user input for selecting a first key among the plurality of keys, providing, by the electronic device, a second sentence including a first word corresponding to the first key; and
  transmitting, by the electronic device, a second message including the second sentence to the external device, through the communication established between the electronic device and the external device.

2. The method of claim 1, wherein the identifying of the plurality of candidate sentences further comprises:
identifying the plurality of candidate sentences from a first database of past conversation information associated with a user of the electronic device, or a second database of conversation information that is acquired from at least one of a social network service (SNS), a web page, an e-mail, a messenger, or a short message service (SMS).

3. A non-transitory computer readable recording medium recorded with a computer program for executing the method of claim 1.

4. An electronic device for providing an adaptive keyboard interface, the electronic device comprising:
at least one processor that, when executing instructions, is configured to control the electronic device to:
receive a first message including a first sentence from an external device, through a communication established between the electronic device and the external device,
identify a plurality of candidate sentences as a response to the first sentence based at least partially on context information which is identified based on at least one message which is received by the electronic device or is transmitted from the electronic device,
in response to separating the plurality of candidate sentences as a predetermined unit, identify a plurality of words included in the plurality of candidate sentences,
display a user interface including a plurality of keys corresponding to the plurality of words, the plurality of text objects each corresponding to at least one text included in the at least one candidate sentence respectively,
in response to a user input for selecting a first key object among the plurality of keys, provide a second sentence including a first word corresponding to the first key, and
transmit a second message including the second sentence to the external device, through the communication established between the electronic device and the external device.

5. A method for inputting a reply using an adaptive keyboard based on content of conversation, the method comprising:
receiving, by a wirelessly communicable device, a first message including a first sentence from an external device, through a communication established between the wirelessly communicable device and the external device;
identifying, by the wirelessly communicable device, a plurality of candidate sentences as a response to the first sentence based at least partially on context information which is identified based on at least one message which is received by the electronic device or is transmitted from the electronic device;
in response to separating the plurality of candidate sentences as a predetermined unit, identifying, by the wirelessly communicable device, a plurality of words included in the plurality of candidate sentences;
displaying, by the wirelessly communicable device, the adaptive keyboard including a plurality of keys corresponding to the plurality of words;
receiving, by the wirelessly communicable device, a selection of a first key among the plurality of keys;
in response to receiving the selection, providing, by the wirelessly communicable device, a second sentence including a first word corresponding to the first key; and
transmitting, by the wirelessly communicable device, a second message including the second sentence to the external device, through the communication established between the wirelessly communicable device and the external device.

* * * * *